United States Patent [19]

Thornley

[11] 3,780,602

[45] Dec. 25, 1973

[54] LOCKING ARRANGEMENT FOR VEHICLE GEARBOX

[75] Inventor: Derek Thornley, Nelson, England

[73] Assignee: Joseph Lucas (Industries) Limited, London, England

[22] Filed: Feb. 16, 1972

[21] Appl. No.: 226,789

[30] Foreign Application Priority Data
Feb. 17, 1971   Great Britain ..................... 4,884/71

[52] U.S. Cl. ......................... 74/850, 74/477, 74/878
[51] Int. Cl. ............................................. B60k 21/00
[58] Field of Search ...................... 74/477, 476, 878, 74/850

[56] References Cited
UNITED STATES PATENTS 2,637,221   5/1953   Backus et al .................. 74/477 UX
2,847,871   8/1958   Schick ................................. 74/477

Primary Examiner—Milton Kaufman
Attorney—John C. Holman et al.

[57]   ABSTRACT

A locking arrangement for a vehicle gear box comprises a transverse passage in the gear box housing and intersecting the axes of the gear selector rods. An outside one of the rods has a recess and the remainder of the rods have transverse through bores, the recess, the bores and the passage being in alignment when a predetermined gear ratio is selected. Plungers slidable in the rod bores and members slidable in the passage between the rods are movable by an actuator to lock the rods in the position corresponding to the predetermined ratio.

7 Claims, 2 Drawing Figures

PATENTED DEC 25 1973 3,780,602

LOCKING ARRANGEMENT FOR VEHICLE GEARBOX

This invention relates to a locking arrangement for vehicle gear box whereby said box is locked at a predetermined gear ratio.

According to the invention a locking arrangement for a road vehicle gearbox which includes a housing and a plurality of spaced parallel rods whose axes lie substantially in the same plane and which are selectively axially movable in the housing to provide a required gear ratio comprises a transverse passage in the housing, the axis of said passage being perpendicular to the axes of said rods, a recess on an outside one of said rods and facing an adjacent rod, a transverse bore in each of the other rods, said recess, said bores and said passage being substantially aligned when said rods are in a predetermined relative position, a plunger slidable in each said bore, said plungers being dimensioned so as to be able to lie wholly within the circumference of their respective rods, a plurality of members slidable in said passage, one of said members being engageable with said recess, and an actuating element with another of the members so that, when said rods are in said predetermined relative positions, said plungers and said members may be moved simultaneously to lock said rods in said relative positions.

Figure 1:
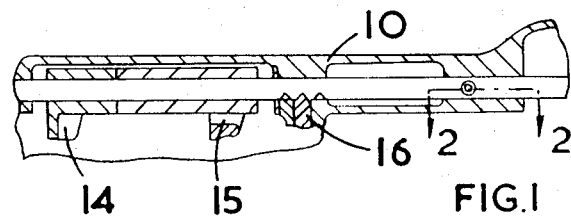
Figure 2:
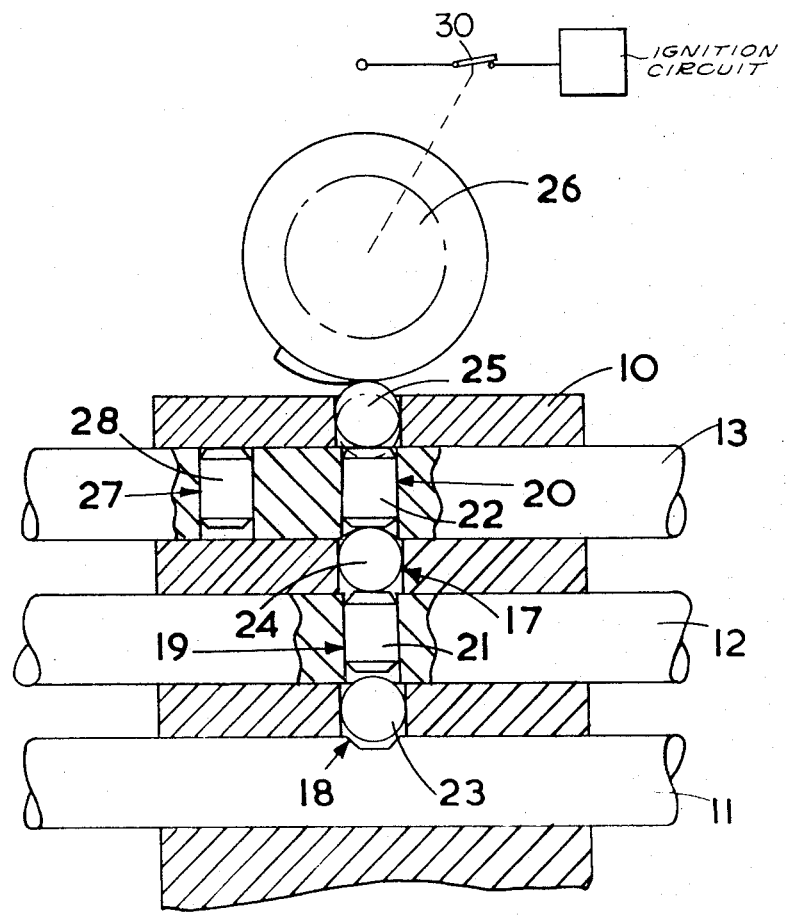

A locking arrangement according to the invention will now be described by way of example and with reference to the accompanying drawings in which:

FIG. 1 is a section through part of a vehicle gearbox, and FIG. 2 is a section, to a different scale, on line 2—2 in FIG. 1.

The gearbox has a housing 10 within which three selector rods 11, 12, 13 are selectively slidable by means of a gear lever (not shown). Rods 11 and 12 carry respective selector forks 14, 15 which engage slidable synchromesh elements (not shown) in a known manner. Rod 13 carries an arm (not shown) which acts in a known manner when rod 13 is moved to select reverse gear in the box. Each of the rods 11, 12, 13 has an associated detent 16 which tends to locate the rods in their selected positions.

Within the housing 10 is a transverse bore 17 whose axis intersects the axes of rods 11, 12, 13 at right angles. Rod 11 is formed with a recess 18 which faces towards the adjacent rod 12. Rods 12, 13 have transverse bores 19, 20 which are positioned such that, when the rods 11, 12, 13 are in relative positions which correspond to neutral gear, bore 17, bores 19, 20 and recess 18, are aligned.

Plungers 21, 22 are respectively slidable in bores 19, 20 the lengths of plungers 21, 22 being such that they can slide wholly within the diameters of the rods 12, 13. Plungers 21, 22 preferably have tapered end so that axial movement of the rods urges the plungers inwardly of the rods.

Within the bore 17 lie three balls 23, 24, 25 which are constrained so as to move axially only of bore 17. The diameters of the balls 23, 24, 25 are greater than the axial dimensions of the portions of the passage 17 in which the respective balls lie so that movement of one of the rods 11, 12, 13 relative to the other rods displaces the ball, or balls, adjacent the said one rod into engagement with the rod, or rods, alongside that one rod. The displaced ball, or balls, moreover, displace any remaining balls, as a result of engagement via the plungers, to lock the said other rods in position.

An edge cam 26 which is rotatable in association with an ignition switch 30 for the vehicle, is engageable with ball 25 to urge the latter towards rod 13 when the vehicle ignition is switched off.

In use, therefore, if neutral gear is selected and the engine ignition circuit switched off, plungers 21, 22 and balls 23, 24, 25 are urged towards rod 11, locking all rods, and consequently, the gearbox, in the neutral position, from which they cannot be moved until the ignition is again switched on.

A further bore 27 extends through rod 13 and carries a plunger 28 substantially identical with plungers 21, 22. The position of bore 27 relative to bore 20 is such that bore 27 is aligned with bore 17 in the body 10 when reverse gear is selected. The gearbox may therby, if desired, be locked in reverse.

I claim:

1. A locking arrangement for a vehicle gearbox which includes a housing and a plurality of spaced parallel rods whose axes lie in substantially the same plane and which are selectively axially movable in the housing to provide a required gear ratio, comprising a transverse passage in the housing, the axis of said passage being perpendicular to the axes of said rods, a recess on an outside one of said rods and facing an adjacent rod, a transverse bore in each of the other rods, said recess, said bores and said passage being substantially aligned when said rods are in a predetermined relative position, a plunger slidable in each said bore, said plungers being dimensioned so as to be able to lie wholly within the circumference of their respective rods, a plurality of members slidable in said passage, one of said members being engageable with said recess, an electric switch forming part of an ignition circuit for the vehicle, and an actuating element operated by said switch and engageable with another of the members so that, when said rods are in said predetermined relative position, said plungers and said members may be moved simultaneously by operation of said switch to lock said rods in said relative position.

2. A locking arrangement as claimed in claim 1 in which the dimensions of said members, axially of the passage, is greater than the axial dimension of that portion of the passage in which the respective members are slidable.

3. A locking arrangement as claimed in claim 1 in which the opposite ends of said plungers are chamfered.

4. A locking arrangement as claimed in claim 1 in which said members comprise balls.

5. A locking arrangemement as claimed in claim 1 in which said actuating element comprises a cam.

6. A locking arrangement as claimed in claim 5 in which said cam is an edge cam engageable with a one of said members which is furthest remote from the said outside one of the rods.

7. A locking arrangement for a vehicle gearbox which includes a housing and a plurality of spaced parallel rods whose axes lie in substantially the same plane and which are selectively, axially movable in the housing to provide a required gear ratio, comprising a transverse passage in the housing, the axis of said passage being perpendicular to the axes of said rods, a recess on an outside one of said rods and facing an adjacent rod, a transverse bore in each of the other rods, said recess, said bores and said passage being substantially aligned when said rods are in a predetermined relative position, a plunger slidable in each said bore, said plungers being dimensioned so as to be able to lie wholly within the circumference of their respective rods, a plurality of members slidable in said passage, one of said members being engageable with said recess, an actuating element engageable with another of the members so that, when said rods are in said predetermined relative positions, said plungers and said members may be moved simultaneously to lock said rods in said relative positions, a further bore in one of said rods and a plunger slidable in said further bore, said further bore being spaced axially of the rod from the first-mentioned bore in the rod, whereby said rods may be locked in a further relative position.

* * * * *